(12) United States Patent
Li et al.

(10) Patent No.: US 9,613,189 B2
(45) Date of Patent: Apr. 4, 2017

(54) METHOD FOR PROCESSING MEDIA CONTENT, CONTROL POINT, MEDIA SERVER, AND MEDIA RENDERER

(71) Applicant: Huawei Device Co., Ltd., Shenzhen (CN)

(72) Inventors: Yan Li, Shenzhen (CN); Yu Zhu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/578,867

(22) Filed: Dec. 22, 2014

(65) Prior Publication Data

US 2015/0113667 A1    Apr. 23, 2015

Related U.S. Application Data

(63) Continuation of application No. PCT/CN2013/086394, filed on Nov. 1, 2013.

(30) Foreign Application Priority Data

Nov. 8, 2012    (CN) .......................... 2012 1 0444015

(51) Int. Cl.
*G06F 21/10*    (2013.01)
*H04L 12/28*    (2006.01)
(Continued)

(52) U.S. Cl.
CPC .......... *G06F 21/10* (2013.01); *H04L 12/2812* (2013.01); *H04L 12/2816* (2013.01);
(Continued)

(58) Field of Classification Search
CPC .......... G06F 21/10; H04L 63/08; H04L 63/10
See application file for complete search history.

(56) References Cited

U.S. PATENT DOCUMENTS

2005/0138137 A1    6/2005 Encarnacion et al.
2005/0283618 A1    12/2005 Min
(Continued)

FOREIGN PATENT DOCUMENTS

CN    1910852 A    2/2007
CN    1984311 A    6/2007
(Continued)

OTHER PUBLICATIONS

Partial English Translation and Abstract of Korean Patent Application No. KR20080029686A, Sep. 7, 2015, 5 pages.
(Continued)

*Primary Examiner* — David Pearson
(74) *Attorney, Agent, or Firm* — Conley Rose, P.C.

(57) ABSTRACT

A method for processing media content is provided. The method includes sending a control command to a media renderer in a home area network, where the control command is used to instruct the media renderer to request authentication with an authentication server; determining a content list, where the content list includes media content items that can be played by media renderers authenticated; displaying the content list to a user; and sending, according to target media content that the user selects to play from the content list and a target media renderer that the user selects for playing the target media content, a uniform resource identifier of the target media content to the target media renderer, so that the target media renderer acquires and plays the target media content. As such, media content selected by a user can be played by an authenticated media renderer.

20 Claims, 15 Drawing Sheets

(51) Int. Cl.
*H04L 29/06* (2006.01)
*H04L 29/08* (2006.01)

(52) U.S. Cl.
CPC .......... *H04L 12/2821* (2013.01); *H04L 63/08* (2013.01); *H04L 67/10* (2013.01); *H04L 67/1023* (2013.01); *G06F 2221/07* (2013.01); *H04L 2012/2849* (2013.01)

(56) References Cited

U.S. PATENT DOCUMENTS

| | | | |
|---|---|---|---|
| 2006/0236232 A1* | 10/2006 | Yuasa | H04N 7/163 715/203 |
| 2007/0039055 A1 | 2/2007 | Plastina et al. | |
| 2007/0208948 A1 | 9/2007 | Costa-Requena et al. | |
| 2008/0025535 A1* | 1/2008 | Rajapakse | H04L 65/605 381/311 |
| 2008/0112405 A1* | 5/2008 | Cholas | H04L 63/062 370/389 |
| 2009/0024717 A1* | 1/2009 | Im | H04L 12/2812 709/218 |
| 2010/0131978 A1* | 5/2010 | Friedlander | H04L 12/2812 725/37 |
| 2010/0333209 A1* | 12/2010 | Alve | G06F 21/10 726/26 |
| 2011/0117842 A1* | 5/2011 | Hong | H04M 1/7253 455/41.2 |
| 2012/0102329 A1* | 4/2012 | Mittal | G06F 21/10 713/176 |
| 2012/0210344 A1 | 8/2012 | Mccoy et al. | |
| 2012/0210346 A1 | 8/2012 | Mccoy et al. | |
| 2015/0040022 A1 | 2/2015 | Pippuri et al. | |

FOREIGN PATENT DOCUMENTS

| | | |
|---|---|---|
| CN | 101243434 A | 8/2008 |
| CN | 101299768 A | 11/2008 |
| CN | 101772768 A | 7/2010 |
| CN | 102647623 A | 8/2012 |
| CN | 102647628 A | 8/2012 |
| EP | 1686728 A1 | 8/2006 |
| KR | 20080029686 A | 4/2008 |
| WO | 2009011502 A1 | 1/2009 |

OTHER PUBLICATIONS

Fasbender, A., et al., "Phone-controlled Delivery of Ngn Services into Residential Environments," The Second International Conference on Next Generation Mobile Applications, Services, and Technologies, Sep. 16, 2008, pp. 196-203.
Sales, T., et al., "A UPnP extension for enabling user authentication and authorization in pervasive systems," Journal of Brazilian Computer Society, vol. 16, No. 4, Oct. 7, 2010, pp. 261-277.
Foreign Communication From a Counterpart Application, European Application No. 13852551.4, Extended European Search Report dated Aug. 28, 2015, 7 pages.
Partial English Translation and Abstract of Chinese Patent Application No. CN1984311A, Apr. 7, 2015, 6 pages.
Partial English Translation and Abstract of Chinese Patent Application No. CN101299768A, Jan. 27, 2015, 3 pages.
"DLNA Guidelines—Part 1-3, Architectures and Protocols—Cloud Access v.900," DLNA, 2014, 16 pages.
Foreign Communication From a Counterpart Application, PCT Application No. PCT/CN2013/086394, English Translation of International Search Report dated Feb. 13, 2014, 2 pages.
Foreign Communication From a Counterpart Application, PCT Application No. PCT/CN2013/086394, Written Opinion dated Feb. 13, 2014, 5 pages.
Foreign Communication From a Counterpart Application, Chinese Application No. 201210444015.8, Chinese Search Report dated May 27, 2016, 2 pages.
Foreign Communication From a Counterpart Application, Chinese Application No. 201210444015.8, Chinese Office fiction dated Jun. 13, 2016, 5 pages.

* cited by examiner

METHOD FOR PROCESSING MEDIA CONTENT, CONTROL POINT, MEDIA SERVER, AND MEDIA RENDERER

CROSS-REFERENCE TO RELATED APPLICATIONS

This application is a continuation of International Application No. PCT/CN2013/086394, filed on Nov. 1, 2013, which claims priority to Chinese Patent Application No. 201210444015.8, filed on Nov. 8, 2012, both of which are hereby incorporated by reference in their entireties.

TECHNICAL FIELD

The present invention relates to the field of communications, and in particular, to a method for processing media content, a control point, a media server, and a media renderer in the field of communications.

BACKGROUND

With development of digital homes and digitization of consumer electronics (CE) products themselves, increasing digital entertainment devices and home electronic appliances are emerging in homes. Connecting these home area network devices in a wired or wireless mode to form a home area network to implement functions such as content sharing and mutual control, is a digital home area network concept that the industry is conceiving and striving to realize.

To implement interworking and control of various home devices, increasing home area network devices support Universal Plug and Play (UPnP), and therefore, the home area network devices may also be referred to as UPnP devices. In a UPnP system, a user controls a home device by using a control point (CP) in the home area network. The CP uses a UPnP protocol, and may read status information of a UPnP device in the home area network by invoking a related control command (Action) of the UPnP device, and control the UPnP device to execute a corresponding operation.

To implement media content sharing between various devices in the home, the UPnP Forum establishes an audio/video (AV) standard. The AV standard defines a media server used to provide AV media resources, and a media renderer used to perform decoding and play media from the media server. The Digital Living Network Alliance (DLNA) cites the UPnP AV standard, and defines device types such as a digital media server (DMS), a digital media renderer (DMR), and a digital media player (DMP).

The DLNA Authentication Task Force (Task Force) is studying a standard for client authentication with a server. The Task Force is studying how to solve an authentication requirement of a commercial video profile (CVP), so as to achieve an objective of allowing the CVP client to play paid content that is acquired from a CVP server (for example, a set top box) and provided by an operator.

Currently, a DLNA authentication technology provides only a 2-box scenario, that is, a scenario in which a CP and a media renderer are located in a same device. In this scenario, after performing authentication with an authentication server, the CP obtains a token, which indicates that the media renderer is authorized. For a 3-box scenario, that is, a CP and a media renderer are not located in a same device; after performing authentication with an authentication server, the CP obtains a token, which only indicates that the CP is authorized. However, other media renderers are not authenticated, and authorization thereof is unknown.

Therefore, if a user wants to push target media content to other media renderers for playing, on the one hand, when the user selects to push the target media content to the other media renderers, the user does not know which media renderers are authorized to play; and on the other hand, because the other media renderers are not authenticated, it is possible that the selected media renderer cannot play the target media content selected by the user.

SUMMARY

Embodiments of the present invention provide a method for processing media content, a CP, a media server, and a media renderer, so that media content selected by a user can be played by an authenticated media renderer.

According to a first aspect, an embodiment of the present invention provides a method for processing media content, where the method includes sending a control command to a media renderer in a home area network, where the control command is used to instruct the media renderer in the home area network to request authentication with an authentication server; determining a first content list, where the first content list includes media content items that can be played by media renderers authenticated by the authentication server; displaying the first content list to a user; and sending, according to target media content that the user selects to play from the first content list and a target media renderer that the user selects for playing the target media content, a uniform resource identifier of the target media content to the target media renderer, so that the target media renderer acquires and plays the target media content.

With reference to the first aspect, in a first possible implementation manner of the first aspect, the determining a first content list includes acquiring identity information of the media renderers authenticated by the authentication server and a second content list including all or a part of media content items on a media server; acquiring, according to the identity information, capability information of the media renderers authenticated by the authentication server; and determining the first content list according to the capability information and the second content list.

With reference to the first aspect, in a second possible implementation manner of the first aspect, the determining a first content list includes sending a first list request to a media server; and receiving the first content list that is sent by the media server according to the first list request, where the first content list includes media content items that can be played by at least one media renderer among all the media renderers authenticated by the authentication server.

With reference to the first aspect, in a third possible implementation manner of the first aspect, the determining a first content list includes acquiring identity information of the media renderers authenticated by the authentication server; sending a second list request to a media server according to the identity information, where the second list request includes identity information of specified media renderers authenticated by the authentication server; and receiving the first content list that is sent by the media server according to the second list request, where the first content list includes media content items that can be played by at least one media renderer among the specified authenticated media renderers.

With reference to the first or third possible implementation manner of the first aspect, in a fourth possible implementation manner of the first aspect, the acquiring identity information of the media renderers authenticated by the authentication server includes sending an identification request to the media server; and receiving an identification reply that is sent by the media server according to the identification request, where the identification reply includes the identity information of the media renderers authenticated by the authentication server.

With reference to the first or third possible implementation manner of the first aspect, in a fifth possible implementation manner of the first aspect, the acquiring identity information of the media renderers authenticated by the authentication server includes sending a status request to the media renderers in the home area network; receiving authentication status information that is sent by the media renderers in the home area network according to the status request; determining, according to the authentication status information, the media renderers authenticated by the authentication server, in the home area network; and acquiring the identity information of the media renderers authenticated by the authentication server.

According to a second aspect, an embodiment of the present invention provides a method for processing media content, where the method includes acquiring identity information and capability information of media renderers authenticated by an authentication server; receiving a list request sent by a CP; determining a content list according to the list request, the identity information, the capability information, and media content items on a media server, where the content list includes media content items that can be played by the authenticated media renderers; and sending the content list to the CP, so that media content selected by a user can be played by the authenticated media renderers.

With reference to the second aspect, in a first possible implementation manner of the second aspect, the determining a content list includes determining the content list according to the list request and the acquired identity information and capability information of the media renderers authenticated by the authentication server, where the content list includes media content items that can be played by at least one media renderer among all the media renderers authenticated by the authentication server.

With reference to the second aspect, in a second possible implementation manner of the second aspect, the determining a content list includes determining the content list according to identity information and/or capability information of media renderers that are specified by the CP and authenticated by the authentication server, where the identity information and/or capability information of media renderers are carried in the list request, and the content list includes media content items that can be played by at least one media renderer among the specified media renderers authenticated by the authentication server.

With reference to the second possible implementation manner of the second aspect, in a third possible implementation manner of the second aspect, the method further includes receiving an identification request sent by the CP; and sending an identification reply to the CP according to the identification request, where the identification reply includes the identity information of the media renderers.

According to a third aspect, an embodiment of the present invention provides a method for processing media content, where the method includes receiving a control command sent by a CP in a home area network, where the control command is used to instruct to request authentication with an authentication server; sending an authentication request to the authentication server according to the control command; receiving a token that is sent by the authentication server according to the authentication request, where the token includes authentication status information; receiving a uniform resource identifier, sent by the CP, of target media content; and acquiring the target media content from a media server according to the token acquired from the authentication server and the uniform resource identifier, and playing the target media content.

With reference to the third aspect, in a first possible implementation manner of the third aspect, the method further includes receiving a status request that is sent by the CP and used to request an authentication status of a media renderer; and sending authentication status information to the CP according to the status request, so that the CP determines, according to the authentication status information, a media renderer authenticated by the authentication server, in the home area network.

According to a fourth aspect, an embodiment of the present invention provides a CP, where the CP includes a first sending module configured to send a control command to a media renderer in a home area network, where the control command is used to instruct the media renderer in the home area network to request authentication with an authentication server; a determining module configured to determine a first content list, where the first content list includes media content items that can be played by media renderers authenticated by the authentication server; a displaying module configured to display the first content list determined by the determining module to a user; and a second sending module configured to send, according to target media content that the user selects to play from the first content list displayed by the displaying module and a target media renderer that the user selects for playing the target media content, a uniform resource identifier of the target media content to the target media renderer, so that the target media renderer acquires and plays the target media content.

With reference to the fourth aspect, in a first possible implementation manner of the fourth aspect, the determining module includes a first acquiring unit configured to acquire identity information of the media renderers authenticated by the authentication server and a second content list including all or a part of media content items on a media server; a second acquiring unit configured to acquire, according to the identity information, acquired by the first acquiring unit, of the media renderers authenticated by the authentication server, capability information of the media renderers authenticated by the authentication server; and a determining unit configured to determine the first content list according to the capability information acquired by the second acquiring unit and the second content list.

With reference to the fourth aspect, in a second possible implementation manner of the fourth aspect, the determining module includes a first sending unit configured to send a first list request to a media server; and a first receiving unit configured to receive the first content list that is sent by the media server according to the first list request sent by the first sending unit, where the first content list includes media content items that can be played by at least one media renderer among all the media renderers authenticated by the authentication server.

With reference to the fourth aspect, in a third possible implementation manner of the fourth aspect, the determining module includes a third acquiring unit configured to acquire identity information of the media renderers authenticated by the authentication server; a second sending unit configured to send a second list request to a media server according to the identity information of the authenticated media renderers which is acquired by the third acquiring unit, where the second list request includes identity information of specified media renderers authenticated by the authentication server; and a second receiving unit configured to receive the first content list that is sent by the media server according to the second list request sent by the second sending unit, where the first content list includes media content items that can be played by at least one media renderer among the specified media renderers authenticated by the authentication server.

With reference to the first or third possible implementation manner of the fourth aspect, in a fourth possible implementation manner of the fourth aspect, the first acquiring unit or the third acquiring unit includes a first sending subunit configured to send an identification request to the media server; and a first receiving subunit configured to receive an identification reply that is sent by the media server according to the identification request sent by the first sending subunit, where the identification reply includes the identity information of the media renderers authenticated by the authentication server.

With reference to the first or third possible implementation manner of the fourth aspect, in a fifth possible implementation manner of the fourth aspect, the first acquiring unit or the third acquiring unit includes a second sending subunit configured to send a status request to the media renderers in the home area network; a second receiving subunit configured to receive authentication status information that is sent by the media renderers in the home area network according to the status request sent by the second sending subunit; a first determining subunit configured to determine, according to the authentication status information received by the second receiving subunit, the media renderers authenticated by the authentication server, in the home area network; and an acquiring subunit configured to acquire the identity information of the media renderers authenticated by the authentication server and determined by the first determining subunit.

With reference to a fifth aspect, an embodiment of the present invention provides a media server, where the media server includes an acquiring module configured to acquire identity information and capability information of media renderers authenticated by an authentication server; a first receiving module configured to receive a list request sent by a CP; a determining module configured to determine a content list according to the list request received by the first receiving module, the identity information and the capability information, acquired by the acquiring module, of the media renderers authenticated by the authentication server, and media content items on the media server, where the content list includes media content items that can be played by the media renderers authenticated by the authentication server; and a first sending module configured to send the content list determined by the determining module to the CP, so that media content selected by a user can be played by the media renderers authenticated by the authentication server.

With reference to the fifth aspect, in a first possible implementation manner of the fifth aspect, the media server further includes a second receiving module configured to receive an identification request sent by the CP; and a second sending module configured to send an identification reply to the CP according to the identification request received by the second receiving module, where the identification reply includes the identity information of the media renderers authenticated by the authentication server.

According to a sixth aspect, an embodiment of the present invention provides a media renderer, where the media renderer includes a first receiving module configured to receive a control command sent by a CP in a home area network, where the control command is used to instruct to request authentication with an authentication server; a first sending module configured to send an authentication request to the authentication server according to the control command received by the first receiving module; a second receiving module configured to receive a token that is sent by the authentication server according to the authentication request sent by the first sending module, where the token includes authentication status information; a third receiving module configured to receive a uniform resource identifier, sent by the CP, of target media content; and a playing module configured to acquire the target media content from a media server according to the token that is acquired from the authentication server and received by the second receiving module and the uniform resource identifier received by the third receiving module, and play the target media content.

With reference to the sixth aspect, in a first possible implementation manner of the sixth aspect, the media renderer further includes a fourth receiving module configured to receive a status request that is sent by the CP and used to request an authentication status of the media renderer; and a second sending module configured to send authentication status information to the CP according to the status request received by the fourth receiving module, so that the CP determines, according to the authentication status information, a media renderer authenticated by the authentication server, in the home area network.

Based on the foregoing technical solutions, with the method for processing media content, the CP, the media server, and the media renderer according to the embodiments of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content, and therefore user experience can be improved.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
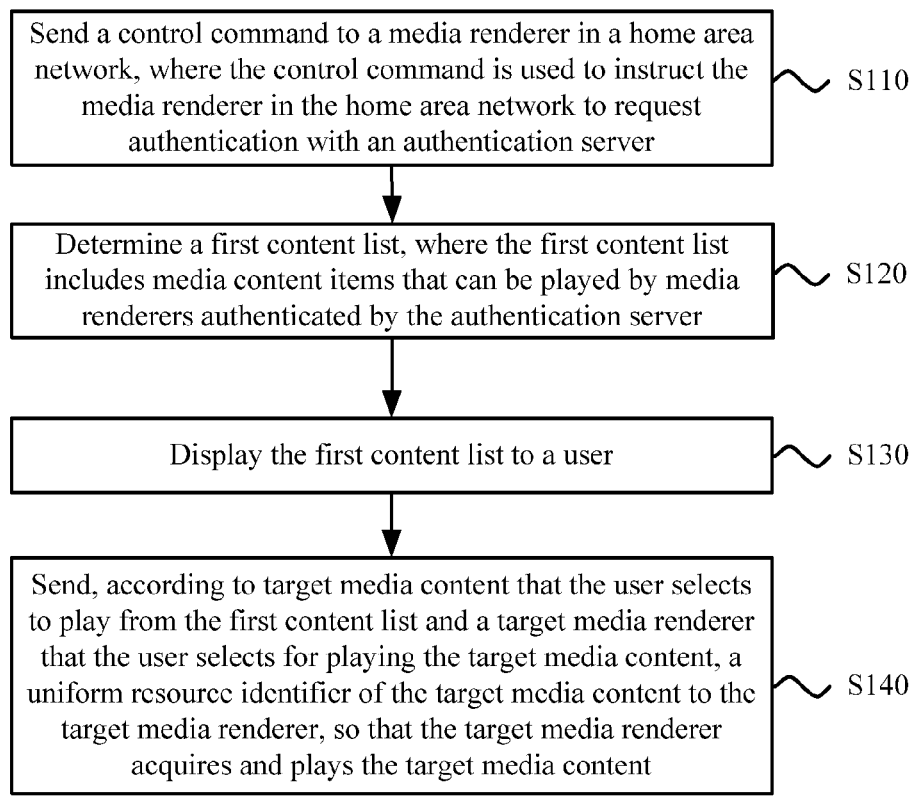
FIG. 1 is a schematic flowchart of a method for processing media content according to an embodiment of the present invention.

FIG. 1 shows a schematic flowchart of a method 100 for processing media content according to an embodiment of the present invention. The method 100, for example, may be executed by a CP. As shown in FIG. 1, the method 100 includes the following steps.

S110. Send a control command to a media renderer in a home area network, where the control command is used to instruct the media renderer in the home area network to request authentication with an authentication server.

S120. Determine a first content list, where the first content list includes media content items that can be played by media renderers authenticated by the authentication server.

S130. Display the first content list to a user.

S140. Send, according to target media content that the user selects to play from the first content list and a target media renderer that the user selects for playing the target media content, a uniform resource identifier of the target media content to the target media renderer, so that the target media renderer acquires and plays the target media content.

A CP may send a control command to a media renderer in a home area network, to trigger the media renderer to perform authentication with an authentication server. The CP may thereby determine a first content list including media content items that can be played by authenticated media renderers, and thereby may display the first content list to a user; after the user selects target media content to be played from the first content list, and the user selects a target media renderer for playing the target media content, the CP may send a uniform resource identifier of the target media content to the target media renderer, so that the target media renderer may acquire and play the target media content.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

It should be understood that in the embodiment of the present invention, only an application scenario in the home area network is used as an example for description, and each device in the home area network performs communication based on a UPnP protocol; however, the present invention is not limited thereto. For example, each device in the home area network may perform communication based on communication methods of various communication systems.

It should also be understood that the communication systems, for example, include a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system.

It should also be understood that in the embodiment of the present invention, the CP and the media renderer may belong to a same device, that is, the CP is the media renderer; certainly, the CP and the media renderer may also belong to different devices, but the present invention is not limited thereto. Similarly, in the embodiment of the present invention, the authentication server and a media server may be located in a same device, and may also belong to different devices; however, the present invention is not limited thereto.

In S110, the CP may send a control command to a media renderer in the home area network, where the control command is used to instruct the media renderer in the home area network to request authentication with the authentication server, so that the media renderer is triggered to perform authentication.

In the embodiment of the present invention, the CP may send the control command to all media renderers in the home area network, to trigger all the media renderers to perform authentication; the CP may also trigger only a part of the media renderers in the home area network to perform authentication. In another aspect, all the media renderers receiving the control command sent by the CP may perform authentication with the authentication server, or only a part of the media renderers perform authentication with the authentication server; however, the present invention is not limited thereto.

For example, the CP may send a Hypertext Transfer Protocol (HTTP) based UPnP control command to a media renderer. For example, the CP sends a StartAuthentiction( ) command to the media renderer, to trigger the media renderer to perform authentication with the authentication server; the media renderer may establish a transport layer security (TLS) connection to the authentication server, and use a certificate for mutual authentication. The authenticated media renderer receives a token sent by the authentication server, where the token may include authentication status information of the media renderer, for example, authentication or authorization information; in addition, the authentication server records information of the authenticated media renderer, for example, records identity and capability information of the authenticated media renderer.

In S120, the CP determines the first content list, where the first content list may include media content items that can be played by media renderers authenticated by the authentication server. That is, the media content items included in the first content list may be played by at least one authenticated media renderer.

In the embodiment of the present invention, optionally, the media content items included in the first content list indicate media content items that the authenticated media renderers are authorized to play, or indicate media content items that the authenticated media renderers are authorized to play and capable of playing.

In the embodiment of the present invention, optionally, the first content list further includes media content items that can be played by the CP. Similarly, the media content items that can be played by the CP may indicate media content items that the CP is authorized to play, or may indicate media content items that the CP is authorized to play and capable of playing. Processing procedures in different cases are hereinafter described with reference to specific examples. For brevity, no further description is provided herein.

In S130, the CP may display the first control list to the user.

For example, the CP may determine, in a user interface (UI) list, a proper electronic program guide (EPG) UI, and display it to the user. The EPG UI includes the first content list. The content items in the first content list may include resolution and format information of the media content, for example, high definition (HD)/H.264 and standard definition (SD)/H.264.

It should be understood that in the embodiment of the present invention, the CP may use a method of a remote user interface (RUI) to display the determined EPG UI to the user; the CP may also use a method of a content directory service (CDS) to display the EPG UI; certainly, the CP may also use other methods to display the first content list to the user, but the embodiment of the present invention is not limited thereto.

In S140, the CP may send, according to the target media content that the user selects to play from the first content list and the target media renderer that the user selects for playing the target media content, the uniform resource identifier (URI) of the target media content to the target media renderer, so that the target media renderer acquires and plays the target media content.

In the embodiment of the present invention, when the media content items included in the first content list indicate media content items that the authenticated media renderers are authorized to play and capable of playing, for example, after the user selects a "Play" or "Play to" button in a specific content item in the first content list, the CP may match the media renderers that are capable of playing target media content corresponding to the content item with media renderers that are in an online state, and display media renderers that are capable of playing the target media content and are still in the online state (that is, finally effective media renderers) to the user, so that the user can further select the target media renderer for playing the target media content.

It should be understood that in the embodiment of the present invention, when the media content items included in the first content list indicate media content items that the authenticated media renderers are authorized to play, the CP further needs to match capabilities of the media renderers, to determine media renderers that not only are authorized to play and capable of playing the target media content but also are in the online state, so that a media renderer finally selected by the user can play the target media content.

In the embodiment of the present invention, the user may select, from the finally effective media renderers displayed by the CP, a target media renderer for playing the target media content, and after the user determines the target media renderer, the CP sends the URI of the target media content to the target media renderer, for example, the CP may send setAVTransportURI( ) and Play( ) instructions to the target media renderer. Thereby, the target media renderer establishes a security connection to the media server, for example, a TLS connection, and the target media renderer requests the target media content from the media server according to the received URI of the target media content. The media server checks the token of the target media renderer, and after determining that the target media renderer is effective, may send the target media content to the target media renderer. In this way, the target media renderer may play the target media content selected by the user, and a case in which the media renderer is not authorized to play the target media content or the media renderer is not capable of playing the target media content and the like does not occur.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content, and therefore user experience can be improved.

A method for determining a first content list by the CP is hereinafter described in detail with reference to FIG. 2 to FIG. 6.

Figure 2:
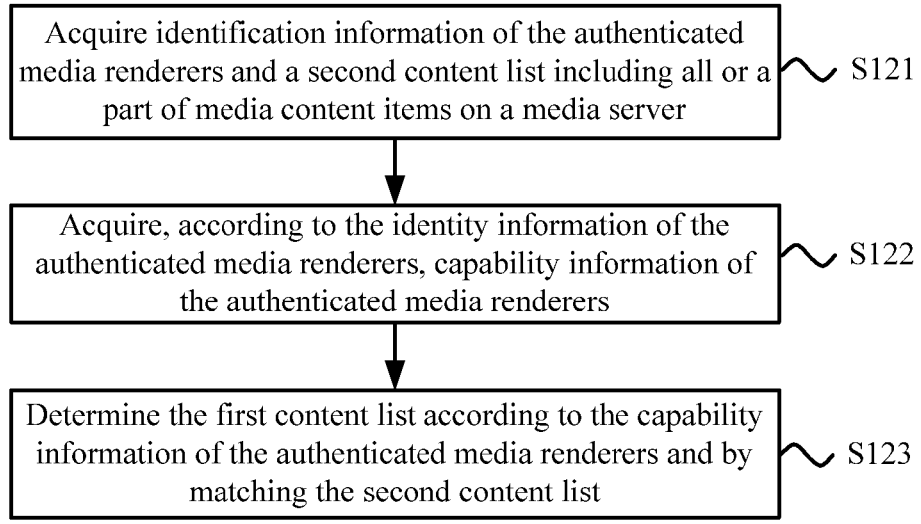
FIG. 2 is a schematic flowchart of a method for determining a first content list according to an embodiment of the present invention.

As shown in FIG. 2, the determining a first content list in S120 in FIG. 1 includes the following steps.

S121. Acquire identity information of the media renderers authenticated by the authentication server and a second content list including all or a part of media content items on a media server.

S122. Acquire, according to the identity information, capability information of the media renderers authenticated by the authentication server.

S123. Determine the first content list according to the capability information and the second content list.

For example, the first content list may be determined according to the capability information and by matching the second content list.

In S121, the CP may acquire the identity information of the media renderers authenticated by the authentication server from the media server, or the CP may also acquire authentication status information of each media renderer from the media renderer, and thereby acquire the identity information of the media renderers authenticated by the authentication server. Detailed descriptions are provided hereinafter with reference to FIG. 5 and FIG. 6 separately. It should be understood that the CP may also use other methods to acquire the identity information of the media renderers authenticated by the authentication server; however, the embodiment of the present invention is not limited thereto.

It should also be understood that the CP may acquire the identity information of all the media renderers authenticated by the authentication server, or may also acquire the identity information of only a part of the media renderers authenticated by the authentication server; however, the embodiment of the present invention is not limited thereto.

In S121, the CP may acquire the second content list from the media server, where the second content list may include all the media content items on the media server, or may include only a part of the media content items on the media server; however, the embodiment of the present invention is not limited thereto.

For example, the CP may send a getUI https request to the media server; after the media server determines an identity of the CP, the media server may send a UI list to the CP, where the user interface list may include all or a part of UIs that the CP is compatible with, and the UI may include a list of all or a part of media content on the media server.

In S122, the CP may request, according to the identity information of the media renderers authenticated by the authentication server, the capability information thereof from the media renderers authenticated by the authentication server.

For example, after acquiring identity information of a media renderer authenticated by the authentication server, the CP may send a getProtocolInfo( )instruction to the media renderer authenticated by the authentication server, and the media renderer receiving the instruction (that is, the media renderer authenticated by the authentication server) may return its capability information to the CP, where the capability information of the media renderer, for example, may include a media format and a transmission protocol.

In S123, the CP may determine, according to the capability information of the media renderers authenticated by the authentication server and by matching the second content list, media content items that can be played by the media renderers authenticated by the authentication server, among the media content items included in the second content list, and thereby may determine the first content list.

For example, the CP may filter the second content list by matching media formats supported by the media renderers with format information included in the media content items, and thereby determine the first content list. It should be understood that the CP may also use other parameters to perform a matching operation; however, the embodiment of the present invention is not limited thereto.

It should be understood that in each embodiment of the present invention, when the first content list further includes media content items that can be played by the CP, the CP further needs to match the second content list with reference to capability information of the CP, to determine the first content list including the media content items that can be played by the CP and/or the media renderers authenticated by the authentication server.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

Figure 3:
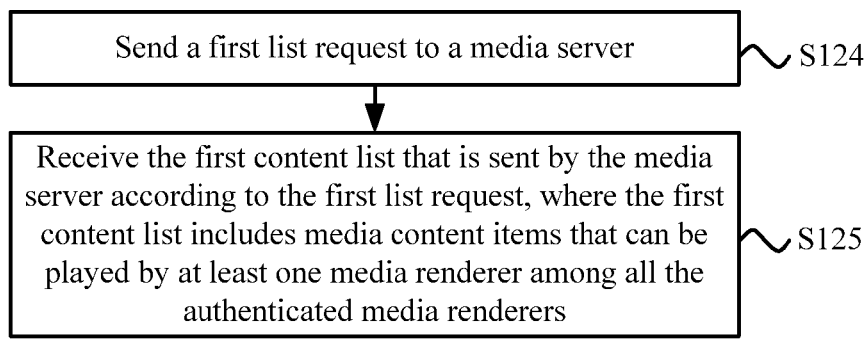
FIG. 3 is another schematic flowchart of a method for determining a first content list according to an embodiment of the present invention.

FIG. 3 shows another schematic flowchart of a method for determining a first content list according to an embodiment of the present invention. As shown in FIG. 3, the determining a first content list in S120 in FIG. 1 includes the following steps.

S124. Send a first list request to a media server.

S125. Receive the first content list that is sent by the media server according to the first list request, where the first content list includes media content items that can be played by at least one media renderer among all the media renderers authenticated by the authentication server.

For example, the CP may request the first content list from the media server; the media server may determine the first content list according to the request of the CP, and identity information and capability information, recorded or acquired by the media server, of the media renderers authenticated by the authentication server, and by matching media content items on the media server, where the first content list may include media content items that can be played by at least one media renderer among all the media renderers authenticated by the authentication server.

It should be understood that in the embodiment of the present invention, if the media server does not record the identity information and/or capability information of the media renderers authenticated by the authentication server, or the media server cannot acquire the identity information and/or capability information of the media renderers authenticated by the authentication server, when the CP requests the first content list from the media server, the request may carry the identity information and/or capability information of all or part of the media renderers authenticated by the authentication server.

Figure 4:
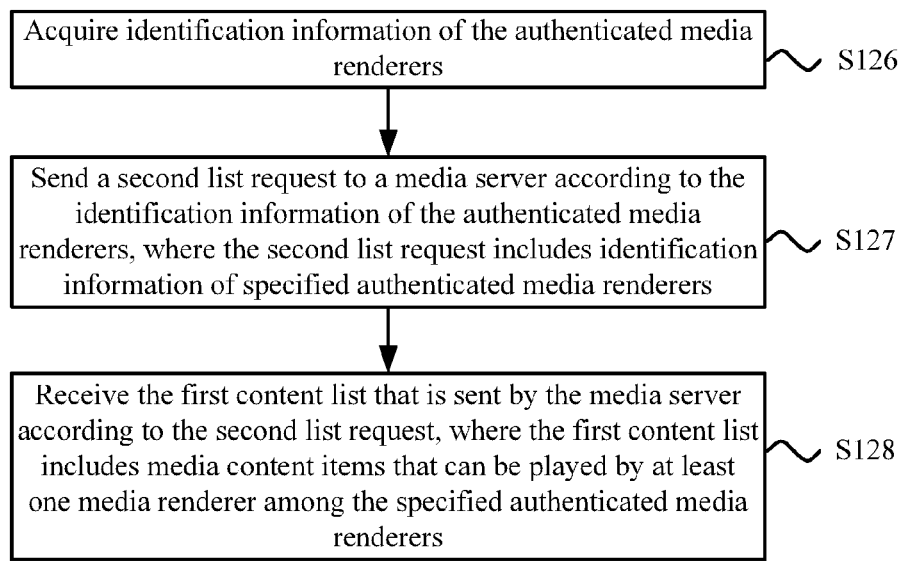
FIG. 4 is still another schematic flowchart of a method for determining a first content list according to an embodiment of the present invention.

FIG. 4 shows still another schematic flowchart of a method for determining a first content list according to an embodiment of the present invention. As shown in FIG. 4, the determining a first content list in S120 in FIG. 1 includes the following steps.

S126. Acquire identity information of the media renderers authenticated by the authentication server.

S127. Send a second list request to a media server according to the identity information, where the second list request includes identity information of specified media renderers authenticated by the authentication server.

S128. Receive the first content list that is sent by the media server according to the second list request, where the first content list includes media content items that can be played by at least one media renderer among the specified media renderers authenticated by the authentication server.

The CP may acquire the identity information of the media renderers authenticated by the authentication server from the media server, or the CP may also acquire authentication status information of each media renderer from the media renderer, and thereby acquire the identity information of the media renderers authenticated by the authentication server. Detailed descriptions are provided hereinafter with reference to FIG. 5 and FIG. 6 separately. The second list request sent by the CP to the media server may include the identity information of the specified media renderers authenticated by the authentication server, and may further include other information, such as capability information, of the specified media renderers authenticated by the authentication server, so that the media server may determine the first content list including media content items that can be played by at least one media renderer among the specified media renderers authenticated by the authentication server.

Similarly, it should be understood that in the embodiment of the present invention, when the first content list further includes media content items that can be played by the CP, the media server further needs to determine, with reference to capability information of the CP, the first content list including the media content items that can be played by the CP and/or the media renderers authenticated by the authentication server. It should also be understood that if the media server does not record the capability information of the CP, the second list request sent by the CP to the media server may carry the capability information of the CP, or the media server may acquire the capability information of the CP by using other methods; however, the embodiment of the present invention is not limited thereto.

In the embodiment of the present invention, when the media server determines the first content list and sends it to the CP, if a method of an RUI is used to display the first content list to the user, the media server may directly annotate, in the first content list, identity (ID) information of corresponding media renderers capable of playing the media content, so that when the user selects the target media content to be played, the CP may display names and identities of these media renderers to the user directly according to the information of the corresponding media renderers capable of playing in the first content list. That is, in the embodiment of the present invention, optionally, the first content list includes the identity information of the media renderers that are capable of playing the media content items and are authenticated by the authentication server.

In the embodiment of the present invention, optionally, content descriptions of the media content items in the first content list include the identity information of the media renderers that are capable of playing the media content items and are authenticated by the authentication server. For example, when a method of a CDS is used to display the first content list to the user, the media server may match the information of the media renderers authenticated by the authentication server with content information in the CDS, to match the content items that can be played by the media renderers authenticated by the authentication server. For each content item, if a media renderer capable of playing the content item, namely, an effective media renderer (each content item may be corresponding to one or more effective media renderers) exists, the media server may add these effective media renderers as a new attribute element of the content item to a content description of the content item, that is, the media server may directly annotate, in the content description of the media content item in the first content list, the identity information of the media renderers that are capable of playing the media content item and are authenticated by the authentication server.

For example, the CDS may be extended, and an attribute element named possibleMediaRenderer is added to a content description in the CDS, where possibleMediaRenderer indicates a media renderer that is capable of playing the content and is authenticated by the authentication server. An example thereof is as follows.

```
<content1>
    <item sourceID="0000000000000010">
    <dc:title>movie1</dc:title>
        <res          protocolInfo="http-get:*:video/WMV:*"          size="1159172"
possibleMediaRenderer="MR1|MR2|MR3"
        deviceUUID="550e8400-e29b-41d4-a716-446655440000">
http://192.168.1.2:53013/MediaServerContent_1/1/0000000000000010/-Unknown-%20-%20mo
vie1.wmv
        </res>
    </item>
</content1>
<content2>
    <item sourceID="0000000000000011">
    <dc:title>movie2</dc:title>
        <res              protocolInfo="http-get:*:video/MPEG4:*"           size="659172"
possibleMediaRenderer="MR2|MR3"
        deviceUUID="560e8400-e29b-41d4-a716-446655441001">
http://192.168.1.2:53013/MediaServerContent_2/1/0000000000000011/-Unknown-%20-%20mo
vie2.mp4
        </res>
    </item>
</content2>
```

In a content description of a media content item named content1, recorded media renderers that are capable of playing media content corresponding to the media content item and are authenticated by the authentication server include MR1, MR2, and MR3; similarly, media renderers that are capable of playing media content corresponding to a media content item named content2 and are authenticated by the authentication server include MR2 and MR3.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

Figure 5:
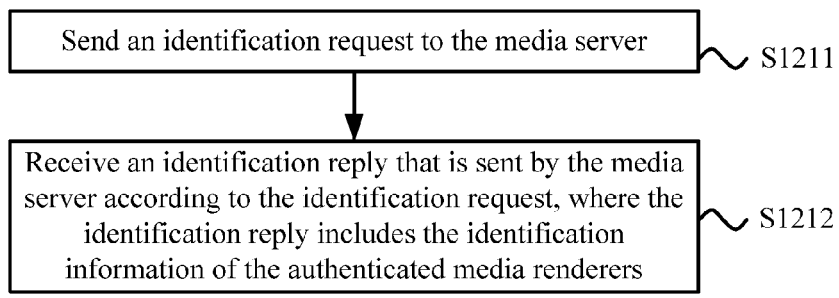
FIG. 5 is a schematic flowchart of a method for acquiring identity information according to an embodiment of the present invention.

FIG. 5 shows a schematic flowchart of a method for acquiring identity information according to an embodiment of the present invention. As shown in FIG. 5, the acquiring identity information of the media renderers authenticated by the authentication server includes the following steps.

S1211. Send an identification request to the media server.

S1212. Receive an identification reply that is sent by the media server according to the identification request, where the identification reply includes the identity information of the media renderers authenticated by the authentication server.

For example, the CP may send a request named getAutenticatedMR( ) to the media server, to request the identity information of the media renderers authenticated by the authentication server and recorded by the media server; after receiving the identification request, the media server may send the identity information of the recorded media renderers authenticated by the authentication server to the CP, and therefore the CP may acquire the identity information of these media renderers.

It should be understood that in each embodiment of the present invention, terms "request", "reply", "response", and the like only represent a carrier that carries information or content, for example, a message, and are not limited to specific names. In addition, the term "reply" or "response" is not limited to a response or a reply to a "request", and may represent only some information or content, or represent a carrier of some information or content, for example, a message; however, the embodiment of the present information is not limited thereto.

Figure 6:
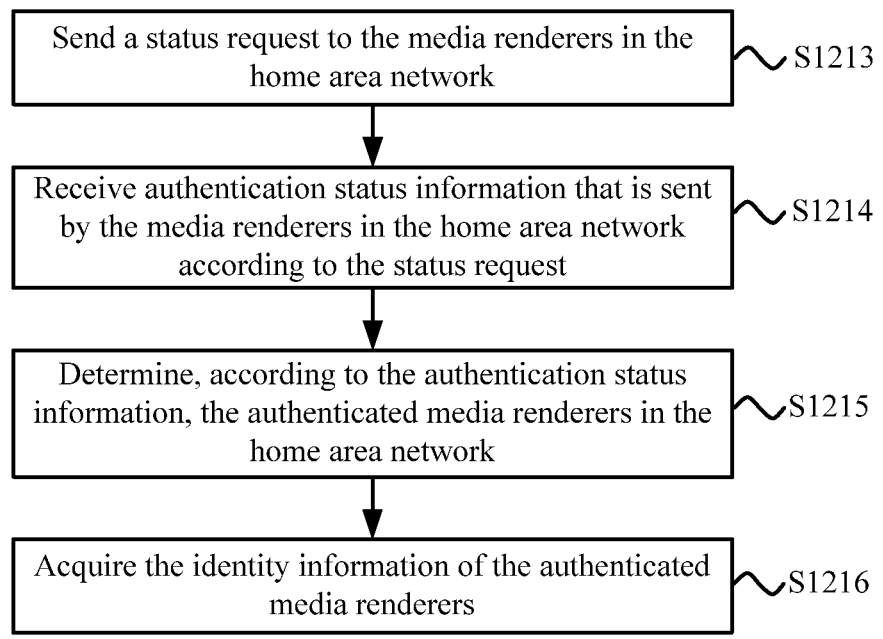
FIG. 6 is another schematic flowchart of a method for acquiring identity information according to an embodiment of the present invention.

FIG. 6 shows another schematic flowchart of a method for acquiring identity information according to an embodiment of the present invention. As shown in FIG. 6, the acquiring identity information of the media renderers authenticated by the authentication server includes the following steps.

S1213. Send a status request to the media renderers in the home area network.

S1214. Receive authentication status information that is sent by the media renderers in the home area network according to the status request.

S1215. Determine, according to the authentication status information, the media renderers authenticated by the authentication server, in the home area network.

S1216. Acquire the identity information of the media renderers authenticated by the authentication server.

That is, by querying an authentication status of each media renderer, the CP may determine the media renderers authenticated by the authentication server, in the home area network, and thereby may acquire the identity information of the media renderers authenticated by the authentication server.

It should be understood that the CP may also use a similar method to acquire capability information or other information of the media renderers authenticated by the authentication server, and that the CP may further use other methods to acquire all types of information of the media renderers authenticated by the authentication server; however, the embodiment of the present invention is not limited thereto.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

The method for processing media content according to the embodiments of the present invention is hereinbefore described in detail with reference to FIG. 1 to FIG. 6 from a perspective of a CP. A method for processing media content according to the embodiments of the present invention is hereinafter described in detail with reference to FIG. 7 to FIG. 10 from perspectives of a media server and a media renderer separately.

Figure 7:
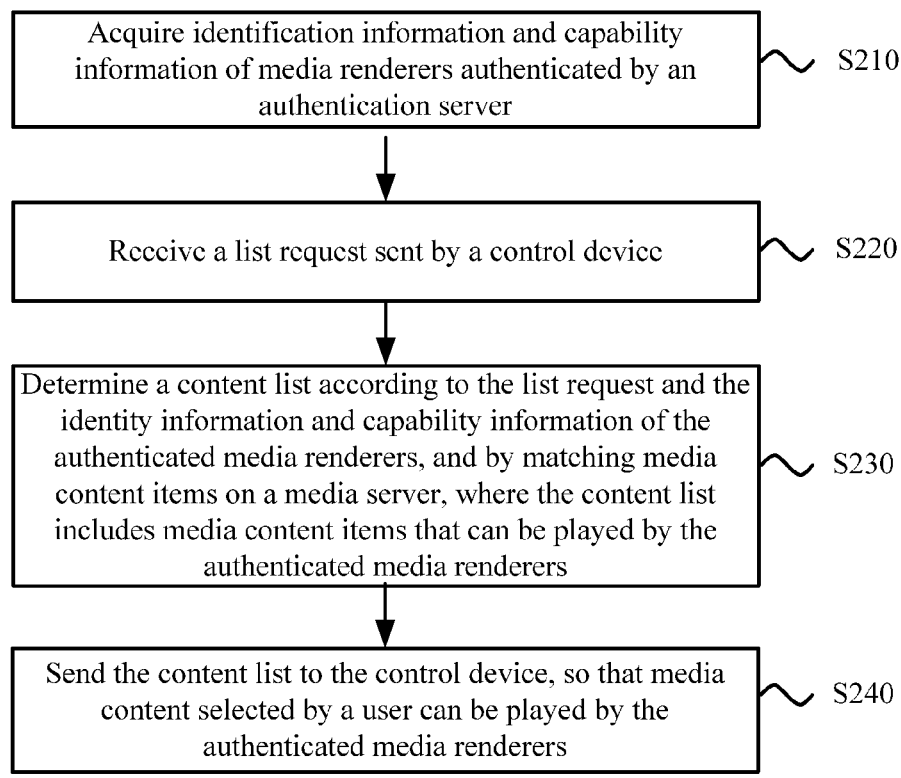
FIG. 7 is a schematic flowchart of a method for processing media content according to another embodiment of the present invention.

As shown in FIG. 7, a method 200 for processing media content according to another embodiment of the present invention may be executed by a media server, and the method 200 includes the following steps.

S210. Acquire identity information and capability information of media renderers authenticated by an authentication server.

S220. Receive a list request sent by a CP.

S230. Determine a content list according to the list request, the identity information and the capability information, and media content items on a media server, where the content list includes media content items that can be played by the media renderers authenticated by the authentication server.

S240. Send the content list to the CP, so that media content selected by a user can be played by the media renderers authenticated by the authentication server.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

In S210, the media server may use multiple methods to acquire the identity information and the capability information of the media renderers authenticated by the authentication server.

Optionally, in the embodiment of the present invention, the acquiring identity information and capability information of media renderers authenticated by an authentication server includes, when the authentication server and the media server are located in a same device, recording the identity information and the capability information of the media renderers authenticated by the authentication server; or when the authentication server and the media server are located in different devices, receiving the identity information and the capability information of the media renderers authenticated by the authentication server, which are sent by the authentication server.

When the authentication server and the media server are located in a same device, that is, the authentication server is located at a local end, and the media server and the authentication server are at the same end, for example, both are located in a set top box, the media server may directly record information of the media renderers authenticated by the authentication server; when the authentication server and the media server are located in different devices, that is, the authentication server is located at a cloud end, and the media server and the authentication server are independent of each other, after the media renderers in the home area network are authenticated by the authentication server, the authentication server may send tokens to these media renderers, and meanwhile also send the tokens to the media server. The tokens may include keys and all types of information of the media renderers, for example, identity information and capability information. Therefore, the media server may acquire the identity information and the capability information of the media renderers authenticated by the authentication server.

In S220, the media server receives the list request sent by the CP, where the list request may carry identity information and/or capability information of specified media renderers authenticated by the authentication server; and may also not carry any information of the media renderers, and only request the content list including media content items that can be played by the media renderers authenticated by the authentication server, from the media server.

In S230, the media server may determine the content list according to the list request and the identity information and the capability information of the media renderers authenticated by the authentication server, and by matching the media content items on the media server, where the content list includes media content items that can be played by the media renderers authenticated by the authentication server.

Optionally, that the media server determines the content list includes determining the content list according to the list request and the acquired identity information and capability information of the media renderers authenticated by the authentication server, where the content list includes media content items that can be played by at least one media renderer among all the media renderers authenticated by the authentication server. For example, when the list request does not include the identity information of the specified media renderers authenticated by the authentication server, the media server matches the media content items on the media server according to the identity information and the capability information of all the media renderers authenticated by the authentication server.

Optionally, that the media server determines the content list includes determining the content list according to identity information and/or capability information, carried in the list request, of media renderers that are specified by the CP and authenticated by the authentication server, where the content list includes media content items that can be played by at least one media renderer among the specified media renderers authenticated by the authentication server. For example, when the list request includes the identity information of the specified media renderers authenticated by the authentication server, the media server matches the media content items on the media server according to the identity information and the capability information of the specified media renderers authenticated by the authentication server.

In S240, the media server sends the content list to the CP. Optionally, the content list includes the identity information of the media renderers that are capable of playing the media content items and are authenticated by the authentication server. Optionally, content descriptions of the media content items in the content list include the identity information of the media renderers that are capable of playing the media content items and are authenticated by the authentication server.

In the embodiment of the present invention, optionally, the media content items included in the content list indicate media content items that the media renderers authenticated by the authentication server are authorized to play, or indicate media content items that the media renderers authenticated by the authentication server are authorized to play and capable of playing.

In the embodiment of the present invention, optionally, the content list further includes media content items that can be played by the CP. Similarly, the media content items that can be played by the CP may indicate media content items that the CP is authorized to play, or may indicate media content items that the CP is authorized to play and capable of playing.

Figure 8:
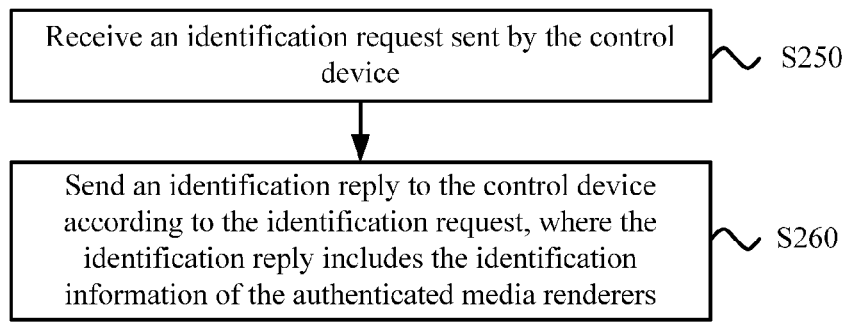
FIG. 8 is another schematic flowchart of a method for processing media content according to another embodiment of the present invention.

FIG. 8 shows another schematic flowchart of a method for processing media content according to another embodiment of the present invention. As shown in FIG. 8, the method 200 further includes the following steps.

S250. Receive an identification request sent by the CP.

S260. Send an identification reply to the CP according to the identification request, where the identification reply includes the identity information of the media renderers authenticated by the authentication server.

For example, the media server receives a request named getAutenticatedMR( )sent by the CP, which requests information of the media renderers that are authenticated by the authentication server and recorded by the media server; and the media server may send, according to the request, the identity information of the media renderers authenticated by the authentication server to the CP.

It should be understood that interaction between the media server, the media renderer, and the CP, and related features and functions thereof and the like, which are described on a media server side, are corresponding to the descriptions on a CP side. For brevity, no further description is provided herein.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

Figure 9:
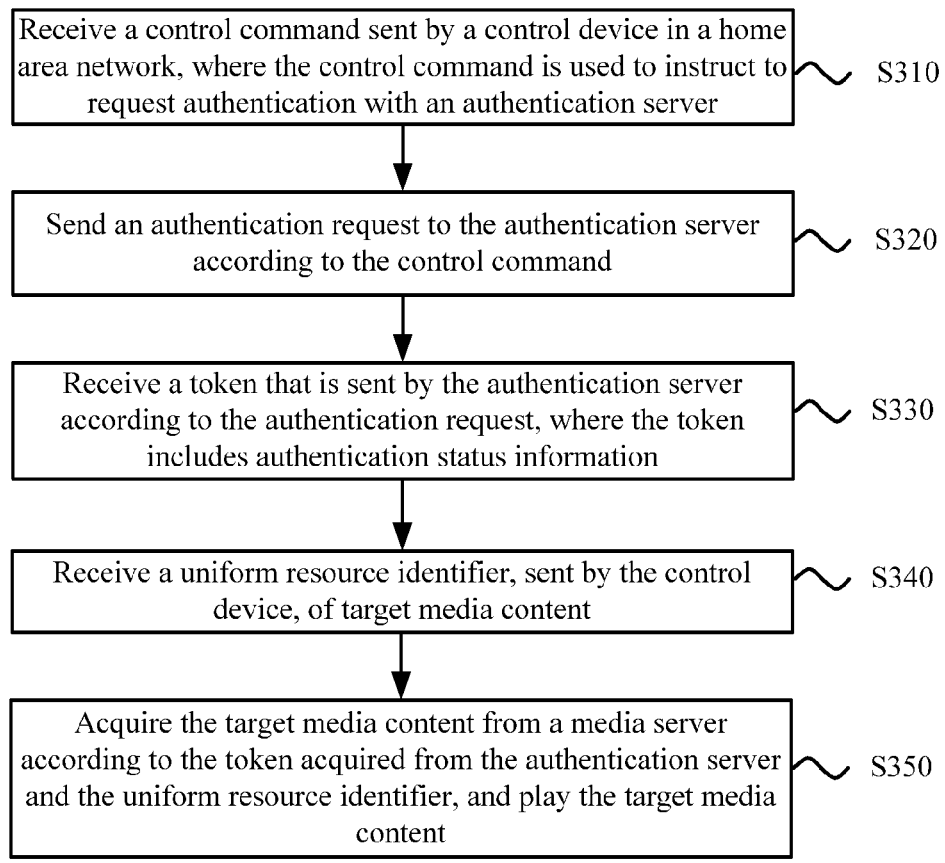
FIG. 9 is a schematic flowchart of a method for processing media content according to still another embodiment of the present invention.

FIG. 9 shows a schematic flowchart of a method 300 for processing media content according to another embodiment of the present invention. The method 300 may be executed by a media renderer. As shown in FIG. 9, the method 300 includes the following steps.

S310. Receive a control command sent by a CP in a home area network, where the control command is used to instruct to request authentication with an authentication server.

S320. Send an authentication request to the authentication server according to the control command.

S330. Receive a token that is sent by the authentication server according to the authentication request, where the token includes authentication status information.

S340. Receive a URI, sent by the CP, of target media content.

S350. Acquire the target media content from a media server according to the token acquired from the authentication server and the URI, and play the target media content.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

Figure 10:
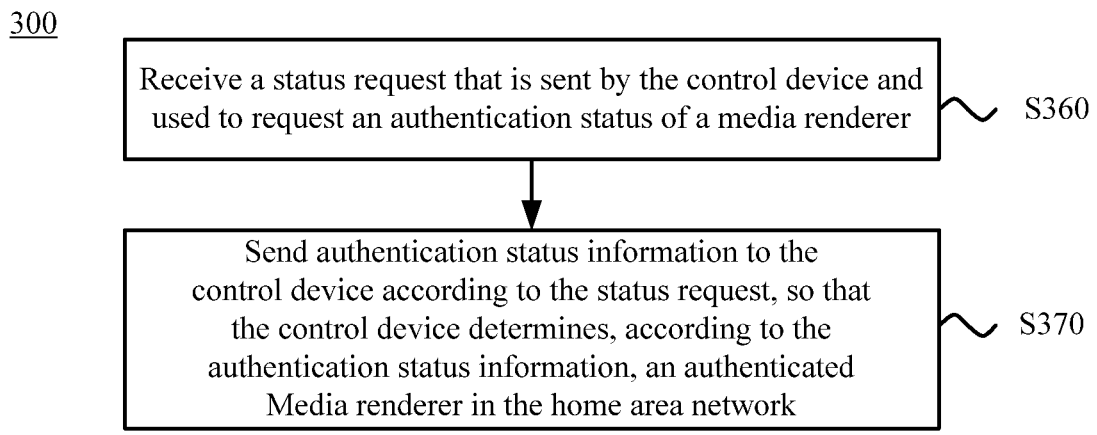
FIG. 10 is another schematic flowchart of a method for processing media content according to still another embodiment of the present invention.

In the embodiment of the present invention, optionally, as shown in FIG. 10, the method 300 further includes the following steps.

S360. Receive a status request that is sent by the CP and used to request an authentication status of a media renderer.

S370. Send authentication status information to the CP according to the status request, so that the CP determines, according to the authentication status information, a media renderer authenticated by the authentication server, in the home area network.

It should be understood that interaction between the media server, the media renderer, and the CP, and related features and functions thereof and the like, which are described on a media renderer side, are corresponding to the descriptions on a CP side and/or a media server side. For brevity, no further description is provided herein.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

Figure 11:
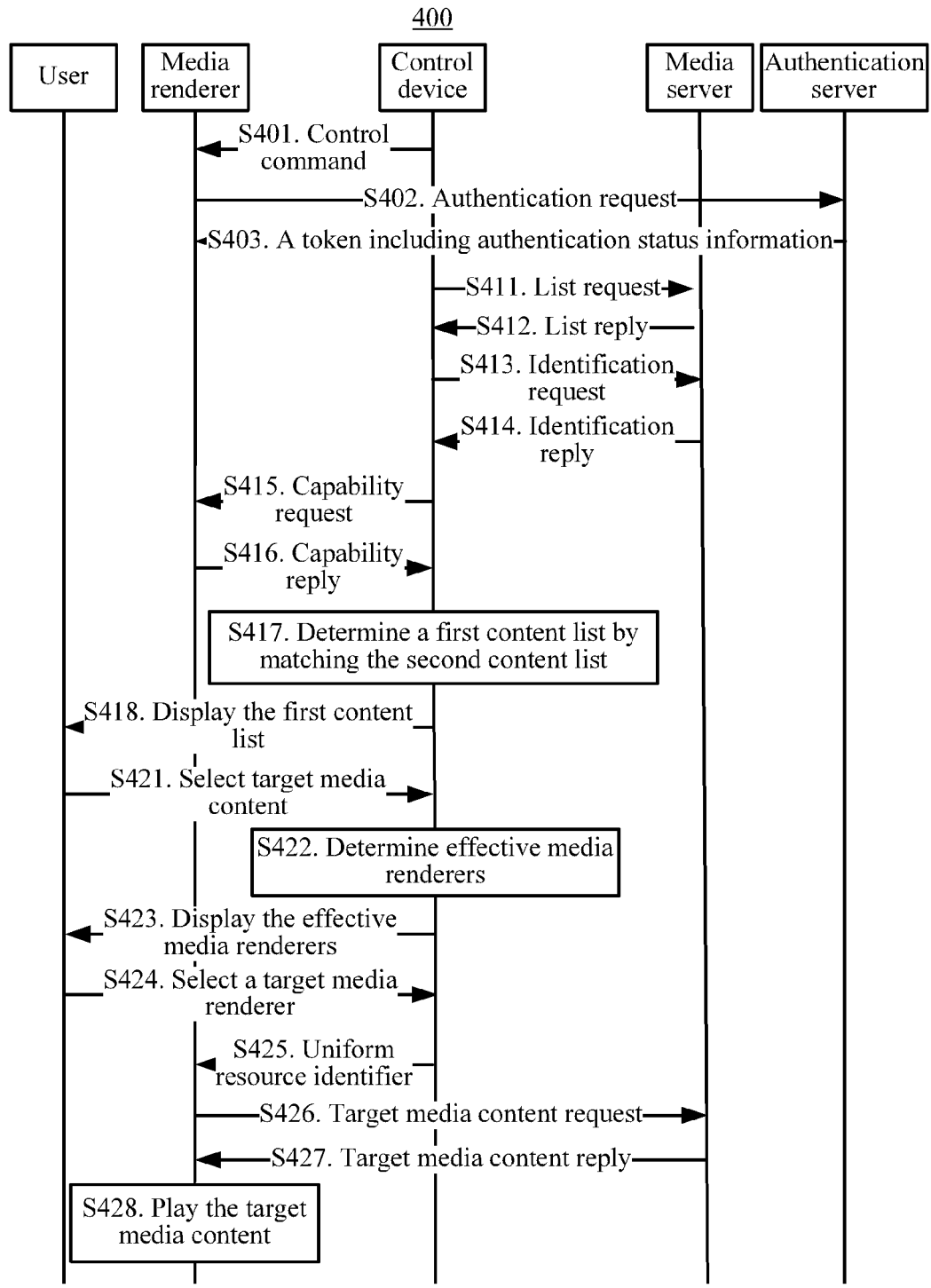
FIG. 11 is a schematic flowchart of a method for processing media content according to still another embodiment of the present invention.

That a CP determines a first content list is hereinafter used as an example for description with reference to FIG. 11, where the first content list includes media content items that can be played by media renderers authenticated by the authentication server; however, the present invention is not limited thereto. As shown in FIG. 11, a method 400 for processing media content according to an embodiment of the present invention includes the following steps.

S401. A CP may send a control command to a media renderer in a home area network, where the control command may be used to instruct the media renderer in the home area network to request authentication with an authentication server.

S402. The media renderer may send an authentication request to the authentication server according to the control command.

S403. The authentication server may send a token to the media renderer according to the authentication request, where the token may include authentication status information of the media renderer.

S411. The CP may request to acquire a second content list from a media server.

S412. The media server may send the second content list to the CP, where the second content list may include all or a part of media content items on the media server.

S413. The CP may send an identification request to the media server.

S414. The media server may send an identification reply to the CP according to the identification request, where the identification reply may include identity information of all or a part of media renderers authenticated by the authentication server.

S415. The CP may send a capability request to the media renderers authenticated by the authentication server, to acquire capability information of the media renderers authenticated by the authentication server.

S416. The media renderers authenticated by the authentication server may return a capability reply to the CP, where the capability reply includes the capability information of the media renderers.

S417. The CP may determine a first content list according to the capability information of the media renderers authenticated by the authentication server, or according to the capability information of the media renderers authenticated by the authentication server and capability information of the CP, and by matching the second content list.

S418. The CP may use a method of an RUI or use a method a CDS to display the first content list to a user.

S421. The user may select target media content expected to be played from the first content list.

S422. The CP may match media renderers that are capable of playing the target media content corresponding to the content item with media renderers that are in an online state, and determine finally effective media renderers, that is, media renderers that are capable of playing the target media content and are still in the online state.

S423. The CP may display the finally effective media renderers to the user.

S424. The user may further select, from the effective media renderers, a target media renderer for playing the target media content.

S425. After the user determines the target media renderer, the CP may send a URI of the target media content to the target media renderer.

S426. The target media renderer may establish a security connection to the media server, and request the target media content from the media server according to the URI.

S427. The media server may send a target media content reply to the target media renderer, where the target media content reply includes the target media content corresponding to the URI.

S428. The target media renderer may play the target media content according to the acquired target media content.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, with the method for processing media content according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

The methods for processing media content according to the embodiments of the present invention are hereinbefore described in detail with reference to FIG. 1 to FIG. 11. Apparatuses for processing media content according to the embodiments of the present invention are hereinafter described in detail with reference to FIG. 12 to FIG. 23, separately.

Figure 12:
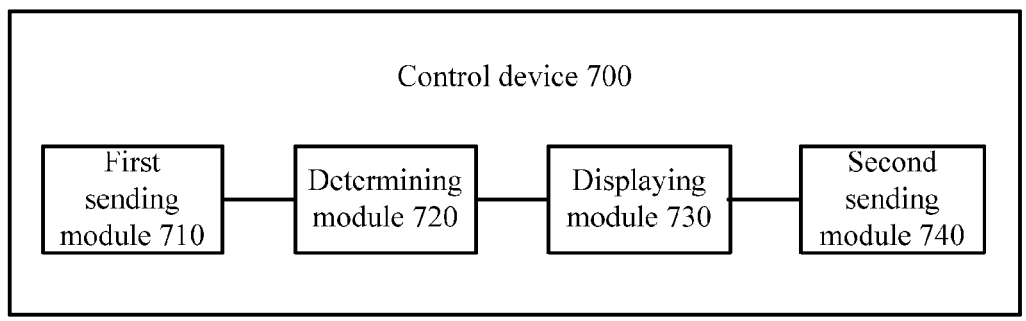
FIG. 12 is a schematic block diagram of a CP according to an embodiment of the present invention.

As shown in FIG. 12, a CP 700 according to an embodiment of the present invention includes a first sending module 710 configured to send a control command to a media renderer in a home area network, where the control command is used to instruct the media renderer in the home area network to request authentication with an authentication server; a determining module 720 configured to determine a first content list, where the first content list includes media content items that can be played by media renderers authenticated by the authentication server; a displaying module 730 configured to display the first content list determined by the determining module 720 to a user; and a second sending module 740 configured to send, according to target media content that the user selects to play from the first content list displayed by the displaying module 730 and a target media renderer that the user selects for playing the target media content, a URI of the target media content to the target media renderer, so that the target media renderer acquires and plays the target media content.

Therefore, with the CP according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content, and therefore user experience can be improved.

Figure 13:
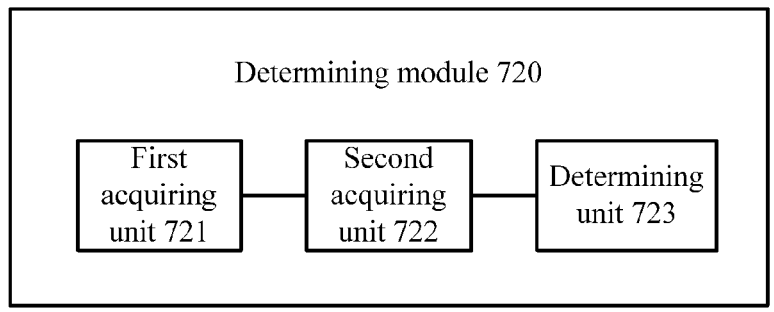
FIG. 13 is a schematic block diagram of a determining module of a CP according to an embodiment of the present invention.

In the embodiment of the present invention, optionally, as shown in FIG. 13, the determining module 720 includes a first acquiring unit 721 configured to acquire identity information of the media renderers authenticated by the authentication server and a second content list including all or a part of media content items on a media server; a second acquiring unit 722 configured to acquire, according to the identity information, acquired by the first acquiring unit 721, of the media renderers authenticated by the authentication server, capability information of the media renderers authenticated by the authentication server; and a determining unit 723 configured to determine the first content list according to the capability information acquired by the second acquiring unit 722 and the second content list.

Figure 14:
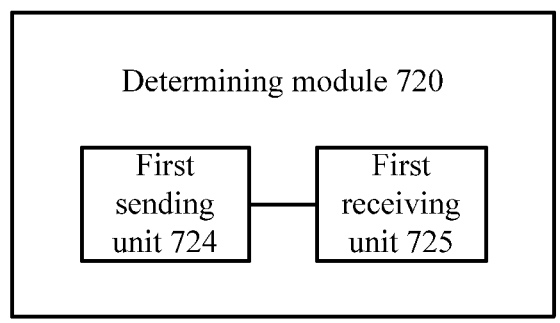
FIG. 14 is another schematic block diagram of a determining module of a CP according to an embodiment of the present invention.

In the embodiment of the present invention, optionally, as shown in FIG. 14, the determining module 720 includes a first sending unit 724 configured to send a first list request to a media server; and a first receiving unit 725 configured to receive the first content list that is sent by the media server according to the first list request sent by the first sending unit 724, where the first content list includes media content items that can be played by at least one media renderer among all the media renderers authenticated by the authentication server.

Figure 15:
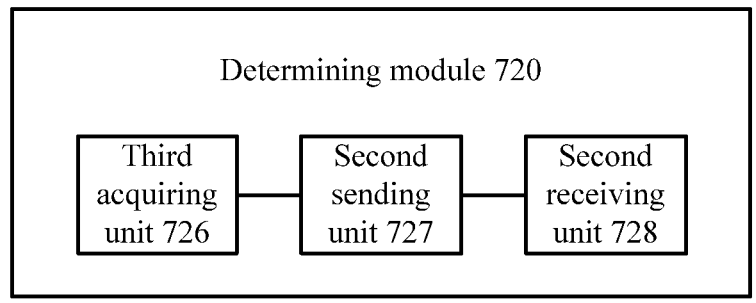
FIG. 15 is still another schematic block diagram of a determining module of a CP according to an embodiment of the present invention.

Optionally, in the embodiment of the present invention, as shown in FIG. 15, the determining module 720 includes a third acquiring unit 726 configured to acquire identity information of the media renderers authenticated by the authentication server; a second sending unit 727 configured to send a second list request to a media server according to the identity information, acquired by the third acquiring unit 726, of the media renderers authenticated by the authentication server, where the second list request includes identity information of specified media renderers authenticated by the authentication server; and a second receiving unit 728 configured to receive the first content list that is sent by the media server according to the second list request sent by the second sending unit 727, where the first content list includes media content items that can be played by at least one media renderer among the specified media renderers authenticated by the authentication server.

Figure 16A:
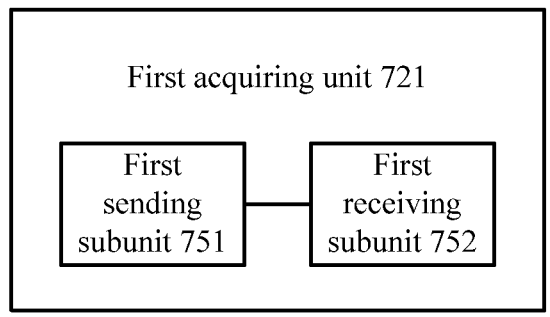
FIG. 16A and FIG. 16B are respectively a schematic block diagram of a first acquiring unit and a schematic block diagram of a third acquiring unit of a CP according to an embodiment of the present invention.
Figure 16B:
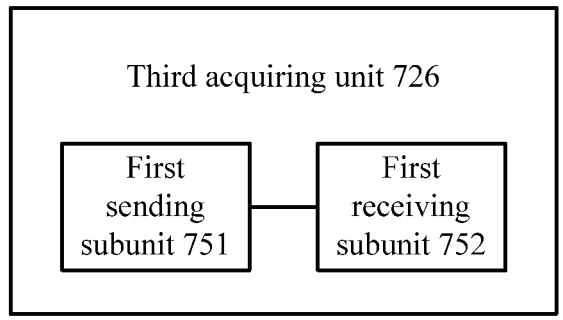

Optionally, in the embodiment of the present invention, as shown in FIG. 16A and FIG. 16B, the first acquiring unit 721 or the third acquiring unit 726 includes a first sending subunit 751 configured to send an identification request to the media server; and a first receiving subunit 752 configured to receive an identification reply that is sent by the media server according to the identification request sent by the first sending subunit 751, where the identification reply includes the identity information of the media renderers authenticated by the authentication server.

Figure 17A:
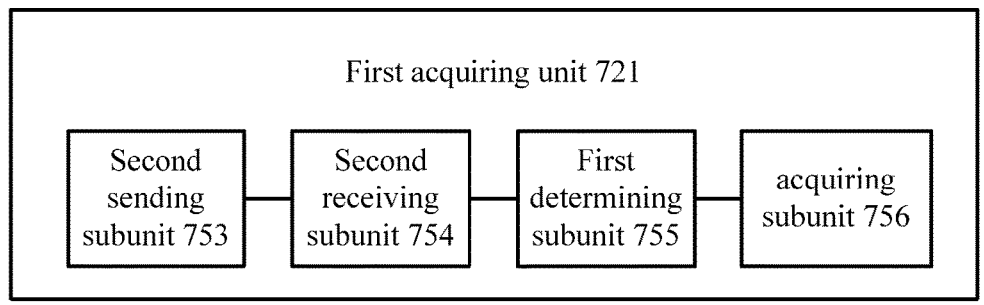
FIG. 17A and FIG. 17B are respectively another schematic block diagram of a first acquiring unit and another schematic block diagram of a third acquiring unit of a CP according to an embodiment of the present invention.
Figure 17B:
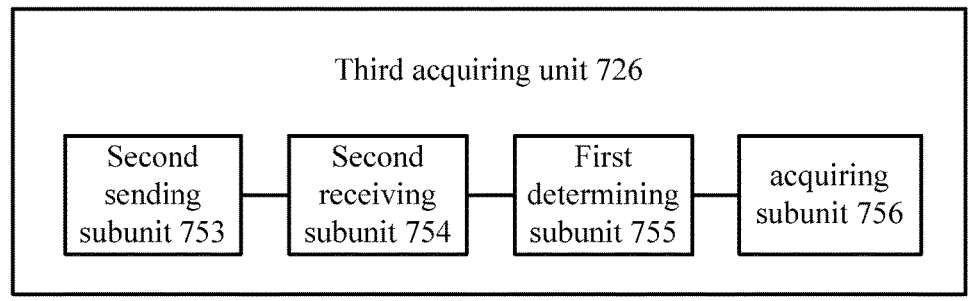

Optionally, in the embodiment of the present invention, as shown in FIG. 17A and FIG. 17B, the first acquiring unit 721 or the third acquiring unit 726 includes a second sending subunit 753 configured to send a status request to the media renderers in the home area network; a second receiving subunit 754 configured to receive authentication status information that is sent by the media renderers in the home area network according to the status request sent by the second sending subunit 753; a first determining subunit 755 configured to determine, according to the authentication status information received by the second receiving subunit 754, the media renderers authenticated by the authentication server, in the home area network; and an acquiring subunit 756 configured to acquire the identity information of the media renderers authenticated by the authentication server and determined by the first determining subunit 755.

In the embodiment of the present invention, optionally, content descriptions of the media content items in the first content list determined by the determining module 720 include the identity information of the media renderers that are capable of playing the media content items and are authenticated by the authentication server.

In the embodiment of the present invention, optionally, the first content list determined by the determining module 720 further includes media content items that can be played by the CP.

In the embodiment of the present invention, optionally, the media content items included in the first content list determined by the determining module 720 indicate media content items that the media renderers authenticated by the authentication server are authorized to play, or indicate media content items that the media renderers authenticated by the authentication server are authorized to play and capable of playing.

It should be understood that the CP 700 according to the embodiment of the present invention may be corresponding to a CP in an embodiment of the present invention, and that the foregoing and other operations and/or functions of the modules in the CP 700 are separately used to implement the corresponding procedures of the methods 100 to 400 in FIG. 1 to FIG. 11, and are not further described herein for brevity.

Therefore, with the CP according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

Figure 18:
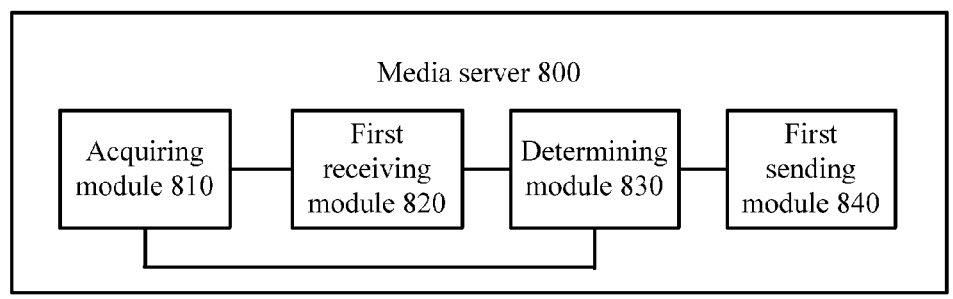
FIG. 18 is a schematic block diagram of a media server according to an embodiment of the present invention.

FIG. 18 shows a schematic block diagram of a media server 800 according to an embodiment of the present invention. As shown in FIG. 18, the media server 800 includes an acquiring module 810 configured to acquire identity information and capability information of media renderers authenticated by an authentication server; a first receiving module 820 configured to receive a list request sent by a CP; a determining module 830 configured to determine a content list according to the list request received by the first receiving module 820 and the identity information and the capability information, acquired by the acquiring module 810, of the media renderers authenticated by the authentication server, and by matching media content items on the media server, where the content list includes media content items that can be played by the media renderers authenticated by the authentication server; and a first sending module 840 configured to send the content list determined by the determining module 830 to the CP, so that media content selected by a user can be played by the media renderers authenticated by the authentication server.

Therefore, with the media server according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content, and therefore user experience can be improved.

Figure 19:
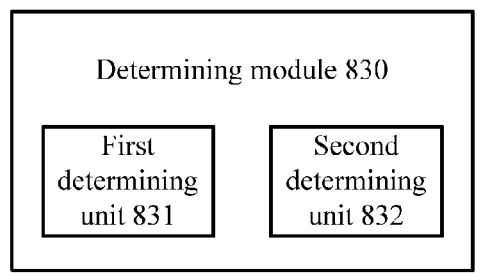
FIG. 19 is a schematic block diagram of a determining module of a media server according to an embodiment of the present invention.

In the embodiment of the present invention, optionally, as shown in FIG. 19, the determining module 830 includes a first determining unit 831 configured to determine the content list according to the list request and the acquired identity information and capability information of the media renderers authenticated by the authentication server, where the content list includes media content items that can be played by at least one media renderer among all the media renderers authenticated by the authentication server.

In the embodiment of the present invention, optionally, as shown in FIG. 19, the determining module 830 includes a second determining unit 832 configured to determine the content list according to identity information and/or capability information, carried in the list request, of media renderers that are specified by the CP and authenticated by the authentication server, where the content list includes media content items that can be played by at least one media renderer among the specified media renderers authenticated by the authentication server.

Figure 20:
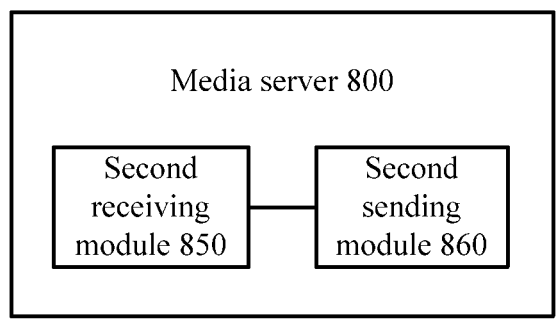
FIG. 20 is another schematic block diagram of a media server according to an embodiment of the present invention.

In the embodiment of the present invention, optionally, as shown in FIG. 20, the media server 800 further includes a second receiving module 850 configured to receive an identification request sent by the CP; and a second sending module 860 configured to send an identification reply to the CP according to the identification request received by the second receiving module 850, where the identification reply includes the identity information of the media renderers authenticated by the authentication server.

Figure 21:
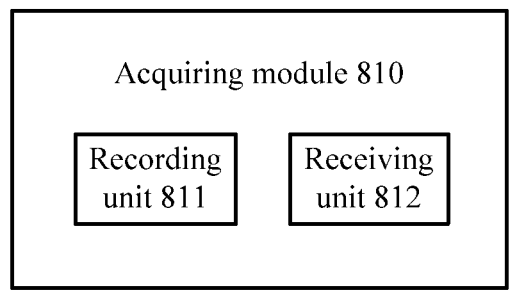
FIG. 21 is a schematic block diagram of an acquiring module of a media server according to an embodiment of the present invention.

In the embodiment of the present invention, optionally, as shown in FIG. 21, the acquiring module 810 includes a recording unit 811 configured to record, when the authentication server and the media server are located in a same device, the identity information and the capability information of the media renderers authenticated by the authentication server; or a receiving unit 812 configured to receive, when the authentication server and the media server are located in different devices, the identity information and the capability information, sent by the authentication server, of the media renderers authenticated by the authentication server.

Optionally, in the embodiment of the present invention, content descriptions of the media content items in the content list determined by the determining module 830 include the identity information of the media renderers that are capable of playing the media content items and are authenticated by the authentication server.

Optionally, in the embodiment of the present invention, the content list determined by the determining module 830 further includes media content items that can be played by the CP.

Optionally, in the embodiment of the present invention, the media content items included in the content list determined by the determining module 830 indicate media content items that the media renderers authenticated by the authentication server are authorized to play, or indicate media content items that the media renderers authenticated by the authentication server are authorized to play and capable of playing.

It should be understood that the media server 800 according to the embodiment of the present invention may be corresponding to a media server in an embodiment of the present invention, and that the foregoing and other operations and/or functions of the modules in the media server 800 are separately used to implement the corresponding procedures of the methods 100 to 400 in FIG. 1 to FIG. 11, and are not further described herein for brevity.

Therefore, with the media server according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content, and therefore user experience can be improved.

Figure 22:
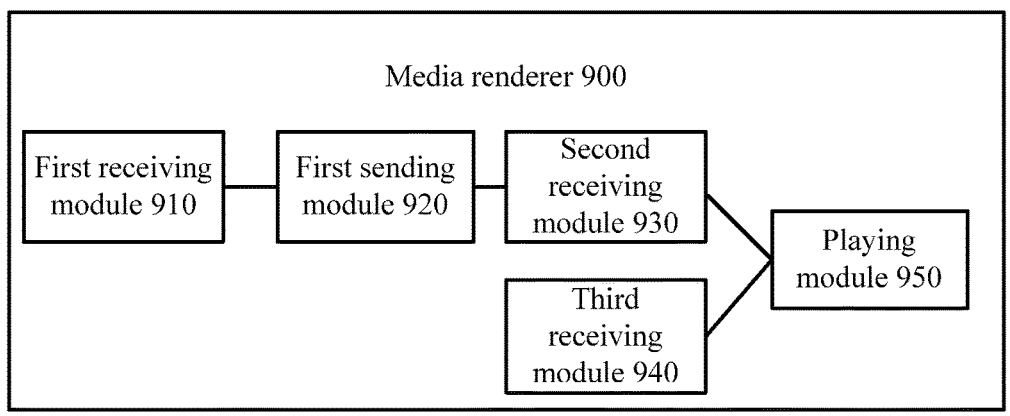
FIG. 22 is a schematic block diagram of a media renderer according to an embodiment of the present invention.

FIG. 22 shows a schematic block diagram of a media renderer 900 according to an embodiment of the present invention. As shown in FIG. 22, the media renderer 900 includes a first receiving module 910 configured to receive a control command sent by a CP in a home area network, where the control command is used to instruct to request authentication with an authentication server; a first sending module 920 configured to send an authentication request to the authentication server according to the control command received by the first receiving module 910; a second receiving module 930 configured to receive a token that is sent by the authentication server according to the authentication request sent by the first sending module 920, where the token includes authentication status information; a third receiving module 940 configured to receive a URI, sent by the CP, of target media content; and a playing module 950 configured to acquire the target media content from a media server according to the token that is acquired from the authentication server and received by the second receiving module 930 and the URI received by the third receiving module 940, and play the target media content.

Figure 23:
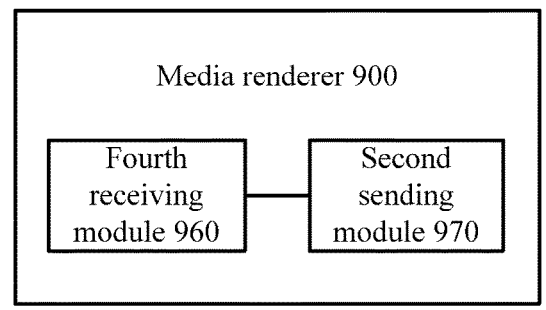
FIG. 23 is another schematic block diagram of a media renderer according to an embodiment of the present invention.

In the embodiment of the present invention, optionally, as shown in FIG. 23, the media renderer 900 further includes a fourth receiving module 960 configured to receive a status request that is sent by the CP and used to request an authentication status of the media renderer; and a second sending module 970 configured to send authentication status information to the CP according to the status request received by the fourth receiving module 960, so that the CP determines, according to the authentication status information, a media renderer authenticated by the authentication server, in the home area network.

It should be understood that the media renderer 900 according to the embodiment of the present invention may be corresponding to a media renderer in an embodiment of the present invention, and that the foregoing and other operations and/or functions of the modules in the media renderer 900 are separately used to implement the corresponding procedures of the methods 100 to 400 in FIG. 1 to FIG. 11, and are not further described herein for brevity.

Therefore, with the media renderer according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

An embodiment of the present invention further provides a CP, where the CP includes a transmitter, a processor, and a display. The transmitter is configured to send a control command to a media renderer in a home area network, where the control command is used to instruct the media renderer in the home area network to request authentication with an authentication server. The processor is configured to determine a first content list, where the first content list includes media content items that can be played by media renderers authenticated by the authentication server. The display is configured to display the first content list to a user. The transmitter is further configured to send, according to target media content that the user selects to play from the first content list and a target media renderer that the user selects for playing the target media content, a URI of the target media content to the target media renderer, so that the target media renderer acquires and plays the target media content.

Optionally, the processor is further configured to acquire identity information of the media renderers authenticated by the authentication server and a second content list including all or a part of media content items on a media server; acquire, according to the identity information of the media renderers authenticated by the authentication server, capability information of the media renderers authenticated by the authentication server; and determine the first content list according to the capability information of the media renderers authenticated by the authentication server and by matching the second content list.

Optionally, the CP further includes a receiver. The transmitter is further configured to send a first list request to a media server. The receiver is configured to receive the first content list that is sent by the media server according to the first list request, where the first content list includes media content items that can be played by at least one media renderer among all the media renderers authenticated by the authentication server.

Optionally, the CP further includes a receiver. The processor is further configured to acquire identity information of the media renderers authenticated by the authentication server. The transmitter is further configured to send a second list request to a media server according to the identity information of the media renderers authenticated by the authentication server, where the second list request includes identity information of specified media renderers authenticated by the authentication server. The receiver is configured to receive the first content list that is sent by the media server according to the second list request, where the first content list includes media content items that can be played by at least one media renderer among the specified media renderers authenticated by the authentication server.

Optionally, the CP further includes a receiver. The transmitter is further configured to send an identification request to a media server. The receiver is configured to receive an identification reply that is sent by the media server according to the identification request, where the identification reply includes the identity information of the media renderers authenticated by the authentication server.

Optionally, the CP further includes a receiver. The transmitter is further configured to send a status request to the media renderers in the home area network. The receiver is configured to receive authentication status information that is sent by the media renderers in the home area network according to the status request. The processor is further configured to determine, according to the authentication status information, the media renderers authenticated by the authentication server, in the home area network, and further configured to acquire the identity information of the media renderers authenticated by the authentication server.

Optionally, content descriptions of the media content items in the first content list include the identity information of the media renderers that are capable of playing the media content items and are authenticated by the authentication server.

Optionally, the first content list further includes media content items that can be played by the CP.

Optionally, the media content items included in the first content list indicate media content items that the media renderers authenticated by the authentication server are authorized to play, or indicate media content items that the media renderers authenticated by the authentication server are authorized to play and capable of playing.

Therefore, with the CP according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

An embodiment of the present invention further provides a media server, where the media server includes a receiver, a processor, and a transmitter. The processor is configured to acquire identity information and capability information of media renderers authenticated by an authentication server. The receiver is configured to receive a list request sent by a CP. The processor is further configured to determine a content list according to the list request and the identity information and the capability information of the media renderers authenticated by the authentication server, and by matching media content items on the media server, where the content list includes media content items that can be played by the media renderers authenticated by the authentication server. The transmitter is configured to send the content list to the CP, so that media content selected by a user can be played by the media renderers authenticated by the authentication server.

In the embodiment of the present invention, optionally, the processor is further configured to determine the content list according to the list request and the acquired identity information and capability information of the media renderers authenticated by the authentication server, where the content list includes media content items that can be played by at least one media renderer among all the media renderers authenticated by the authentication server.

In the embodiment of the present invention, optionally, the processor is further configured to determine the content list according to identity information and/or capability information, carried in the list request, of media renderers that are specified by the CP and authenticated by the authentication server, where the content list includes media content items that can be played by at least one media renderer among the specified media renderers authenticated by the authentication server.

In the embodiment of the present invention, optionally, the receiver is further configured to receive an identification request sent by the CP; and the transmitter is further configured to send an identification reply to the CP according to the identification request, where the identification reply includes the identity information of the media renderers authenticated by the authentication server.

In the embodiment of the present invention, optionally, the processor is further configured to record, when the authentication server and the media server are located in a same device, the identity information and the capability information of the media renderers authenticated by the authentication server; or the receiver is further configured to receive, when the authentication server and the media server are located in different devices, the identity information and the capability information, are sent by the authentication server, of the media renderers authenticated by the authentication server.

In the embodiment of the present invention, optionally, content descriptions of the media content items in the content list include the identity information of the media renderers that are capable of playing the media content items and are authenticated by the authentication server.

In the embodiment of the present invention, optionally, the content list further includes media content items that can be played by the CP.

In the embodiment of the present invention, optionally, the media content items included in the content list indicate media content items that the media renderers authenticated by the authentication server are authorized to play, or indicate media content items that the media renderers authenticated by the authentication server are authorized to play and capable of playing.

Therefore, with the media server according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

An embodiment of the present invention further provides a media renderer, where the media renderer includes a receiver, a processor, and a transmitter. The receiver is configured to receive a control command sent by a CP in a home area network, where the control command is used to instruct to request authentication with an authentication server. The transmitter is configured to send an authentication request to the authentication server according to the control command. The receiver is further configured to receive a token that is sent by the authentication server according to the authentication request, where the token includes authentication status information. The receiver is further configured to receive a URI, sent by the CP, of target media content. The processor is configured to acquire the target media content from a media server according to the token that is acquired from the authentication server and the URI, and play the target media content.

In the embodiment of the present invention, optionally, the receiver is further configured to receive a status request that is sent by the CP and used to request an authentication status of the media renderer; and the transmitter is further configured to send authentication status information to the CP according to the status request, so that the CP determines, according to the authentication status information, a media renderer authenticated by the authentication server, in the home area network.

Therefore, with the media renderer according to the embodiment of the present invention, a content list displayed to a user includes media content items that can be played by media renderers authenticated by an authentication server, so that media content selected by the user can be played by the authenticated media renderers. In this way, it can be avoided that a media renderer selected by the user is not authorized to play or not capable of playing the media content.

It should be understood that the foregoing CP, media server, and media renderer are respectively corresponding to the CP 700, media server 800, and media renderer 900, and that the foregoing and other operations and/or functions of the modules are separately used to implement the corresponding procedures of the methods 100 to 400 in FIG. 1 to FIG. 11, and are not further described herein for brevity.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing media content, comprising:
acquiring identity information of media renderers authenticated by an authentication server and a second content list comprising all or a part of media content items on a media server;
acquiring, according to the identity information, capability information of the media renderers authenticated by the authentication server;
generating a first content list, according to the capability information and the second content list, by matching the capability information of the media renderers to the media content items in the second content list, wherein the first content list comprises media content items that can be played by the media renderers authenticated by the authentication server;
displaying the first content list to a user, wherein the first content list is displayed to the user on a user interface, wherein the user interface comprises a first section and a second section, wherein the first section displays a first media content item and effective media renderers for the first media content item, wherein the effective media renderers for the first media content item comprise a first portion of the media renderers that have an online status and that have a capability and authorization to play the first media content item, wherein the second section displays a second media content item and effective media renderers for the second media content item, wherein the effective media renderers for the second media content item comprise a second portion of the media renderers that have the online status and that have a capability and authorization to play the second media content item, and wherein the first portion of the media renderers and the second portion of the media renderers have different numbers of media renderers; and
sending, according to target media content that the user selects to play from the first content list and a target media renderer that the user selects for playing the target media content, a uniform resource identifier of the target media content to the target media renderer such that the target media renderer acquires and plays the target media content.

2. The method according to claim 1, wherein generating the first content list comprises:
sending a first list request to a media server; and
receiving the first content list that is sent by the media server according to the first list request,
wherein the first content list comprises media content items that can be played by at least one media renderer among all the media renderers authenticated by the authentication server.

3. The method according to claim 1, wherein generating the first content list comprises:
sending a second list request to a media server according to the identity information, wherein the second list request comprises identity information of specified media renderers authenticated by the authentication server; and
receiving the first content list that is sent by the media server according to the second list request,
wherein the first content list comprises media content items that can be played by at least one media renderer among the specified media renderers authenticated by the authentication server.

4. The method according to claim 1, wherein acquiring the identity information of the media renderers authenticated by the authentication server comprises:
sending an identification request to the media server; and
receiving an identification reply that is sent by the media server according to the identification request,
wherein the identification reply comprises the identity information of the media renderers authenticated by the authentication server.

5. The method according to claim 1, wherein acquiring the identity information of the media renderers authenticated by the authentication server comprises:
sending a status request to the media renderers in the home area network;
receiving authentication status information that is sent by the media renderers in the home area network according to the status request;
determining, according to the authentication status information, the media renderers authenticated by the authentication server, in the home area network; and
acquiring the identity information of the media renderers authenticated by the authentication server.

6. The method according to claim 1, further comprising sending a control command to a media renderer in a home area network, wherein the control command is used to instruct the media renderer in the home area network to request authentication with the authentication server.

7. A method for processing media content, comprising:
acquiring identity information and capability information of media renderers authenticated by an authentication server;
receiving a list request sent by a control point;
generating a content list according to the list request, the identity information, the capability information of the media renderers, and media content items on a media server by matching the capability information of the media renderers to the media content items on the media server, wherein the content list comprises media content items that can be played by the media renderers; and
sending the content list to the control point such that media content selected by a user can be played by the media renderers,
wherein the content list is displayed to the user on a user interface,
wherein the user interface comprises a first section and a second section,
wherein the first section displays a first media content item and effective media renderers for the first media content item,
wherein the effective media renderers for the first media content item comprise a first portion of the media renderers that have an online status and that have a capability and authorization to play the first media content item,
wherein the second section displays a second media content item and effective media renderers for the second media content item,
wherein the effective media renderers for the second media content item comprise a second portion of the media renderers that have online status and that have a capability and authorization to play the second media content item, and
wherein the first portion of the media renderers and the second portion of the media renderers have different numbers of media renderers.

8. The method according to claim 7, wherein the method further comprises:
receiving an identification request sent by the control point; and
sending an identification reply to the control point according to the identification request,
wherein the identification reply comprises the identity information of the media renderers.

9. A method for processing media content, comprising:
receiving a control command sent by a control point in a home area network, wherein the control command is used to instruct to request authentication with an authentication server;
sending an authentication request to the authentication server according to the control command;
receiving a token that is sent by the authentication server according to the authentication request, wherein the token comprises a status of authentication;
receiving a uniform resource identifier, sent by the control point, of target media content, wherein the target media content is selected from a content list that is displayed to a user on a user interface, wherein the user interface comprises a first section and a second section, wherein the first section displays a first media content item and elective media renderers for the first media content item, wherein the effective media renderers for the first media content item comprise a first portion of the media renderers that have an online status and that have a capability and authorization to play the first media content item, wherein the second section displays a second media content item and effective media renderers for the second media content item, wherein the effective media renderers for the second media content item comprise a second portion of the media renderers that have the online status and that have a capability and authorization to play the second media content item, and wherein the first portion of the media renderers and the second portion of the media renderers have different numbers of media renders;
acquiring the target media content from a media server according to the token acquired from the authentication server and the uniform resource identifier; and
playing the target media content.

10. The method according to claim 9, wherein the method further comprises:
receiving a status request that is sent by the control point and used to request an authentication status of a media renderer; and
sending authentication status information to the control point according to the status request such that the control point determines, according to the authentication status information, a media renderer authenticated by the authentication server, in the home area network.

11. A control point, comprising:
a processor configured to:
acquire identity information of media renderers authenticated by an authentication server and a second content list that comprises all or a part of media content items on a media server;
acquire, according to the identity information, capability information of the media renderers authenticated by the authentication server; and
generate the first content list according to the capability information and the second content list by matching the capability information of the media renderers to the media content items in the second content list, wherein the first content list comprises media content items that can be played by the media renderers authenticated by the authentication server;
a display configured to display the first content list to a user, wherein the first content list is displayed to the user on a user interface, wherein the user interface comprises a first section and a second section, wherein the first section displays a first media content item and effective media renderers for the first media content item, wherein the effective media renderers for the first media content item comprise a first portion of the media renderers that have an online status and that have a capability and authorization to play the first media content item, wherein the second section displays a second media content item and effective media renderers for the second media content item, wherein the effective media renderers for the second media content item comprise a second portion of the media renderers that have the online status and that have a capability and authorization to play the second media content item, and wherein the first portion of the media renderers and the second portion of the media renderers have different numbers of media renderers; and
a transmitter configured to send, according to target media content that the user selects to play from the first content list displayed by a target media renderer that the user selects for playing the target media content, a uniform resource identifier of the target media content to the target media renderer such that the target media renderer acquires and plays the target media content.

12. The control point according to claim 11, wherein the transmitter is configured to send a first list request to a media server, wherein the control point further comprises a receiver configured to receive the first content list that is sent by the media server according to the first list request, and wherein the first content list comprises media content items that can be played by at least one media renderer among all the media renderers authenticated by the authentication server.

13. The control point according to claim 11, wherein the processor is configured to acquire identity information of the media renderers authenticated by the authentication server, wherein the transmitter is further configured to send a second list request to a media server according to the identity information, wherein the second list request comprises identity information of specified media renderers authenticated by the authentication server, wherein the control point further comprises a receiver configured to receive the first content list that is sent by the media server according to the second list request, and wherein the first content list comprises media content items that can be played by at least one media renderer among the specified media renderers authenticated by the authentication server.

14. The control point according to claim 11, wherein the transmitter is further configured to send an identification request to the media server, wherein the control point further comprises a receiver configured to receive an identification reply that is sent by the media server according to the identification request, and wherein the identification reply comprises the identity information of the media renderers authenticated by the authentication server.

15. The control point according to claim 11, wherein the transmitter is further configured to send a status request to the media renderers in the home area network, wherein the control point further comprises a receiver configured to receive authentication status information that is sent by the media renderers in the home area network according to the status request, and wherein the processor is further configured to:
  determine, according to the authentication status information, the media renderers authenticated by the authentication server, in the home area network; and
  acquire the identity information of the media renderers authenticated by the authentication server.

16. The control point according to claim 11, wherein the transmitter is further configured to send a control command to a media renderer in a home area network, wherein the control command is used to instruct the media renderer in the home area network to request authentication with the authentication server.

17. A media server, comprising:
  a non-transitory computer readable medium having instructions stored thereon; and
  a computer processor coupled to the non-transitory computer readable medium and configured to execute the instructions to:
    acquire identity information and capability information of media renderers authenticated by an authentication server;
    receive a list request sent by a control point, wherein the computer processor is configured to generate a content list according to the list request, the identity information and the capability information of the media renderers, and media content items on the media server by matching the capability information of the media renderers to the media content items on the media server, wherein the content list comprises media content items that can be played by the media renderers, wherein the content list is displayed to a user on a user interface, wherein the user interface comprises a first section and a second section, wherein the first section displays a first media content item and effective media renderers for the first media content item, wherein the effective media renderers for the first media content item comprise a first portion of the media renderers that have an online status and that have a capability and authorization to play the first media content item, wherein the second section displays a second media content item and effective media renderers for the second media content item, wherein the effective media renderers for the second media content item comprise a second portion of the media renderers that have the online status and that have a capability and authorization to play the second media content item, and wherein the first portion of the media renderers and the second portion of the media renderers have different numbers of media renderers; and
    send the content list to the control point such that media content selected by the user can be played by the media renderers.

18. The media server according to claim 17, wherein the computer processor is further configured to execute the instructions to:
  receive an identification request sent by the control point; and
  send an identification reply to the control point according to the identification request, and
  wherein the identification reply comprises the identity information of the media renderers.

19. A media renderer, comprising:
  a non-transitory computer readable medium having instructions stored thereon; and
  a computer processor coupled to the non-transitory computer readable medium and configured to execute the instructions to:
    receive a control command sent by a control point in a home area network, wherein the control command is used to instruct to request authentication with an authentication server;
    send an authentication request to the authentication server according to the control command,
    receive a token that is sent by the authentication server according to the authentication request, wherein the token comprises authentication status information;
    receive a uniform resource identifier, sent by the control point, of target media content, wherein the target media content is selected from a content list that is displayed to a user on a user interface, wherein the user interface comprises a first section and a second section, wherein the first section displays a first media content item and effective media renderers for the first media content item, wherein the effective media renderers for the first media content item comprise a first portion of the media renderers that have an online status and that have a capability and authorization to play the first media content item, wherein the second section displays a second media content item and effective media renderers for the second media content item, wherein the effective media renderers for the second media content item comprise a second portion of the media renderers that have the online status and that have a capability and authorization to play the second media content item, and wherein the first portion of the media renderers and the second portion of the media renderers have different numbers of media renderers;

acquire the target media content a media server according to the token and the uniform resource; and play the target media content.

20. The media renderer according to claim 19, wherein the computer processor is further configured to execute the instructions to:

receive a status request that is sent by the control point and used to request an authentication status of the media renderer; and send authentication status information to the control point according to the status, so that the control point determines, according to the authentication status information, a media renderer authenticated by the authentication server, in the home area network.

* * * * *

UNITED STATES PATENT AND TRADEMARK OFFICE
CERTIFICATE OF CORRECTION

| | | |
|---|---|---|
| PATENT NO. | : 9,613,189 B2 | Page 1 of 1 |
| APPLICATION NO. | : 14/578867 | |
| DATED | : April 4, 2017 | |
| INVENTOR(S) | : Yan Li and Yu Zhu | |

It is certified that error appears in the above-identified patent and that said Letters Patent is hereby corrected as shown below:

On the Title Page

Page 2, References Cited, Other Publications section should read:

"FASBENDER, A., et al., "Phone-controlled Delivery of NGN Services into Residential Environments," The Second International Conference on Next Generation Mobile Applications, Services, and Technologies, September 16, 2008, pages 196-203."

Page 2, References Cited, Other Publications section should read:

"Foreign Communication From A Counterpart Application, Chinese Application No. 201210444015.8, Chinese Office Action dated June 13, 2016, 5 pages."

In the Claims

Column 31, Line 34, Claim 7 should read:

"wherein the effective media renderers for the second media content item comprise a second portion of the media renderers that have the online status and that have a capability and authorization to play the second media content item, and"

Signed and Sealed this
Thirtieth Day of May, 2017

Michelle K. Lee
*Director of the United States Patent and Trademark Office*